United States Patent [19]

Schaefer-Sindlinger et al.

[11] Patent Number: 5,234,883
[45] Date of Patent: Aug. 10, 1993

[54] CATALYST FOR HARDENING FATTY ACIDS AND PROCESS FOR ITS PREPARATION

[75] Inventors: Adolf Schaefer-Sindlinger, Frankfurt; Dietrich Arntz, Oberursel, both of Fed. Rep. of Germany

[73] Assignee: Degussa Aktiengesellschaft, Frankfurt am Main, Fed. Rep. of Germany

[21] Appl. No.: 853,281

[22] Filed: Mar. 18, 1992

[30] Foreign Application Priority Data

Mar. 22, 1991 [DE] Fed. Rep. of Germany ....... 4109502

[51] Int. Cl.⁵ .................. B01J 21/06; B01J 23/44
[52] U.S. Cl. ....................................... 502/339
[58] Field of Search ........................ 502/325, 339

[56] References Cited

U.S. PATENT DOCUMENTS

| | | | |
|---|---|---|---|
| 3,390,119 | 6/1968 | Alexander et al. | 260/33.6 |
| 3,579,569 | 5/1971 | Montgomery et al. | 260/497 |
| 4,479,902 | 10/1984 | Rosen | 260/409 |
| 4,839,329 | 6/1989 | Ihm et al. | 502/339 |
| 5,002,917 | 3/1991 | Deller et al. | 502/242 |

FOREIGN PATENT DOCUMENTS

| | | |
|---|---|---|
| 1157344 | 11/1983 | Canada. |
| 0327723 | 8/1989 | European Pat. Off. . |
| 1667084 | 1/1963 | Fed. Rep. of Germany . |
| 59-112835 | 6/1984 | Japan ............... 502/339 |

OTHER PUBLICATIONS

Koth, D., et al., "Eigenschaften hochtemperaturhydrolytisch hergestellter Kieselsaeuren und Metalloxide fuer Katalysatoren", Chem. Ing. Tech. (1980), vol. 52, pp. 628–634.

Primary Examiner—W. J. Shine
Attorney, Agent, or Firm—Beveridge, DeGrandi, Weilacher & Young

[57] ABSTRACT

A catalyst for hardening unsaturated fatty acids obtained from the decomposition of fat is described, formed of an intimate mixture of titanium oxide and finely divided palladium metal, wherein the titanium oxide is pyrogenic titanium oxide obtained from titanium tetrachloride by flame hydrolysis.

14 Claims, 2 Drawing Sheets

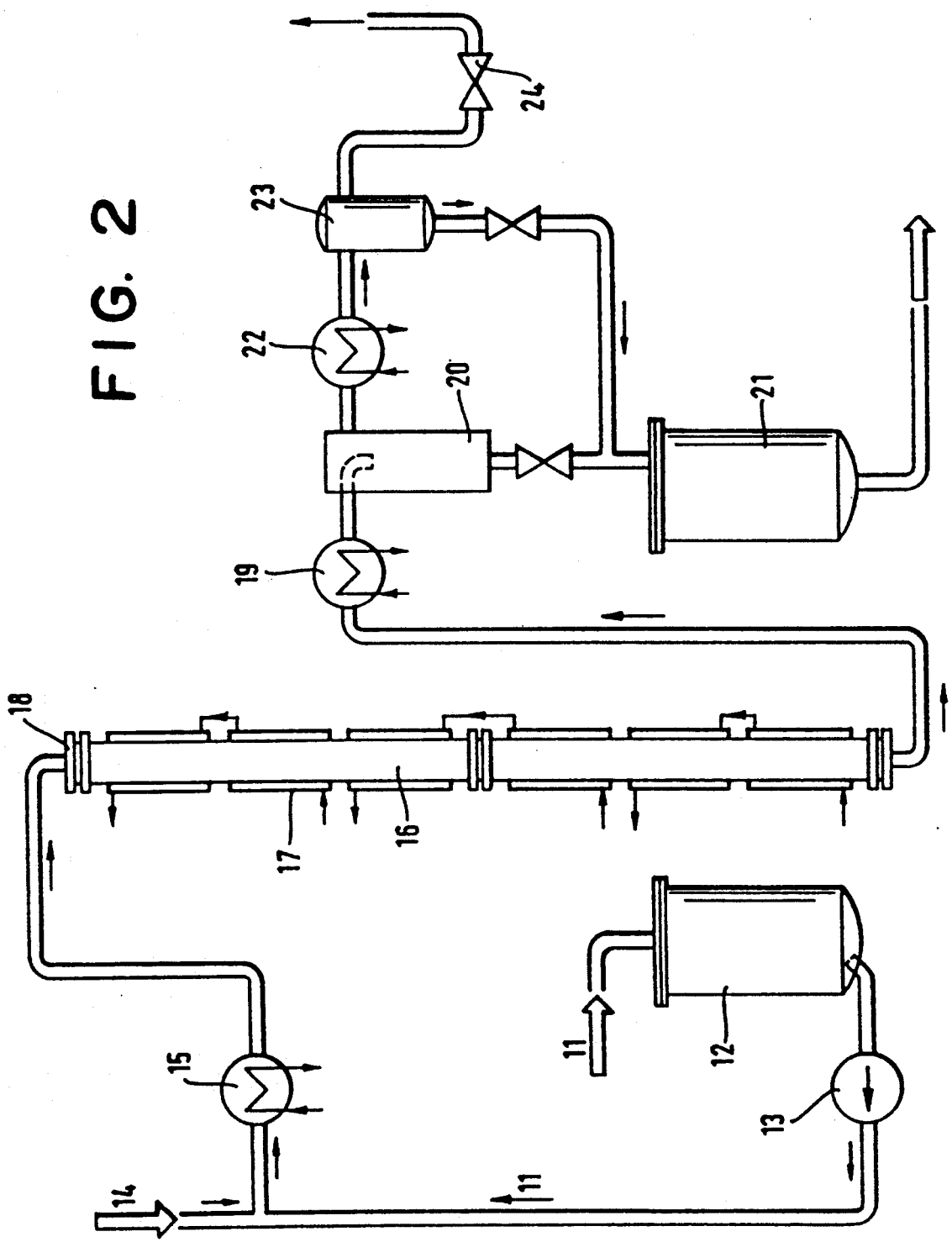

CATALYST FOR HARDENING FATTY ACIDS AND PROCESS FOR ITS PREPARATION

BACKGROUND OF THE INVENTION

The present invention relates to a molded catalyst for hardening unsaturated fatty acids, comprising an intimate mixture of titanium oxide and finely divided palladium metal. In another aspect, the present invention relates to a process for preparing the molded catalyst.

Fatty acids are an important intermediate product in the chemistry of fats. They are obtained either by the oxidation of paraffins, by oxosynthesis from olefins, by saponification of nitriles or by the decomposition of fats. The latter process is of great importance as it utilizes replaceable raw materials.

Fatty acids from vegetable or animal sources have chain lengths of from 12 to 30 carbon atoms. Most of these fatty acids are unsaturated, with up to 3 double bonds. These double bonds, in particular the triple double bonds, are the cause of the low thermal stability of unsaturated fatty acids and the ease with which they undergo oxidation.

For use of the unsaturated fatty acids in industry, the double bonds must be removed by hydrogenation as completely as possible and at the same time the acid character of the fatty acids must be preserved. Hydrogenation to fatty alcohols is in this case undesirable. The procedure resulting in saturated fatty acids without double bonds in the carbon chain is also known as hardening of the fatty acids.

The quality of hardened fatty acids is determined by the iodine number and the acid number in accordance with the regulations of the Deutsches Arzneibuch, 7th edition, 1968. The iodine number (JZ) is a measure of the proportion of unsaturated fatty acids in fats and the acid number (SZ) is used to determine the proportion of free organic acids in fats.

Naturally occurring fats have iodine numbers ranging from 150 (soya bean oil) to 50 (beef tallow), depending on the degree of saturation. The object of technical hardening of fatty acids from such natural sources is to reduce the iodine number to values below 1 while leaving the acid number as far as possible unchanged to improve the color, odor and resistance to heat.

The crude fatty acids used for the production of industrial fatty acid products are in most cases highly contaminated waste products from other industrial sources. Hydrogenation of these fatty acids is mainly carried out batchwise at temperatures from 100° to 300° and elevated hydrogen pressure of from 0.15 to 3.5 MPa in the presence of a suitable catalyst. Nickel catalysts in the form of finely divided nickel are mainly used for this purpose, either directly or deposited on silicon oxide as a carrier (Ullmann's Encyclopedia of Industrial Chemistry, vol. A10, page 268, VCH Weinheim 1987).

Disadvantages of this process are the high catalyst consumption due to the catalyst poisons present in the crude fatty acids (compounds of sulphur, phosphorus, chlorine and nitrogen), the formation of nickel soaps by the fatty acids and the need to remove the catalysts introduced into the crude fatty acids from the fatty acids by filtration after hardening. In addition, the product must be distilled to remove the nickel soaps.

The life of the catalysts can be increased and hence the consumption of catalysts reduced by distilling the crude fatty acids prior to hardening. This, however, requires the introduction of an additional process step and thereby generally renders the whole process less economical. One important criterion for assessing the quality of a catalyst for hardening is therefore its service life in operation when used for crude fatty acids, i.e., its resistance to catalyst poisons.

In addition to nickel catalysts, noble metal carrier catalysts are known for hardening fatty acids. Their advantages lie in the simplicity of the process and the absence of saponification. They are, however, easily damaged by the catalyst poisons present in the crude fatty acids (see, for example, M. Zajcew: "Fett-Hydrierung mit Palladium als Katalysator VII: Fettsäuren" in Fett-Seifen-Anstrichmittel, 66 (1964), 794). Although noble metal carrier catalysts can be regenerated relatively easily with only slight loss of noble metal, these catalysts are used mainly for hardening distilled fatty acids in order to keep the catalyst poisoning low.

Noble metal carrier catalysts are particularly suitable for the continuous hardening of fatty acids. The precondition for this, however, is that not only the active noble metal component but also the carrier material should be sufficiently resistant to attack by the fatty acids. In the case of continuous hardening, the catalyst activity is defined by the so-called LHSV-value (Liquid hourly space velocity). The describes how much liquid volume can be converted in the desired manner per hour for a given volume of catalyst under the given process conditions (temperature, $H_2$-pressure).

A palladium catalyst on active charcoal is proposed in Canadian Patent Specification CA 1 157 844 for the continuous hardening of fatty acids. According to Example 7 of the said Patent Specification, this catalyst is capable, at LHSV-values of 0.2 $h^{-1}$, of hardening distilled beef tallow fatty acids having an iodine number of 58 to final iodine numbers of from 0.2 to 0.7. The temperature employed was 190° C. and the hydrogen pressure 2.5 MPa. When the LHSV-value was increased to 0.6 $h^{-1}$ (Example 8), the final iodine number rose to 2.5-3.3. It has been found in practice that although relatively good hardening results are obtained for distilled fatty acids at low LHSV-values (0.2 $h^{-1}$), the results are considerably inferior when crude fatty acids are used. This catalyst is therefore not suitable for economical hardening of fatty acids on a large industrial scale. The LHSV-values obtainable are too low and the necessary distillation of the crude fatty acids constitutes an additional, cost intensive process step.

Apart from noble metal catalysts on active charcoal carriers, noble metal catalysts on oxidic carriers are also known. These, however, are only used for selective hardening of fatty acids in the food industry. Thus, for example, U.S. Pat. No. 4,479,902 describes a catalyst of platinum or palladium on a carrier of $TiO_2$, $Ta_2O_5$, $V_2O_5$ or $Nb_2O_5$ for the selective hardening of soya bean oil to iodine numbers of 100. This catalyst is not suitable for the complete hardening of fatty acids owing to its high selectivity.

SUMMARY OF THE INVENTION

It is therefore an object of the present invention to provide a catalyst for the continuous hardening of crude fatty acids obtained from the decomposition of fats, which catalyst would have improved activity, a low tendency to be poisoned and good acid resistance and would be capable of hardening crude fatty acids for prolonged periods at LHSV-values $\geq 1$ $h^{-1}$. It is a further object of the invention to develop a process for the preparation of the catalyst.

In achieving the above and other objects, one feature of the invention resides in a molded catalyst for hardening unsaturated fatty acids, comprising an intimate mixture of titanium oxide and finely divided palladium metal, wherein the titanium oxide is pyrogenic titanium oxide obtained from titanium tetrachloride by the process of flame hydrolysis.

In a preferred embodiment of the catalyst, the pyrogenic titanium oxide has an average size of primary particles of 20 nm, a density of 3.7 g/cm$^3$ and an X-ray structure of from 20 to 40% rutile and 80 to 60% anatase and the impurities consisting of silicon dioxide, aluminum oxide and iron oxide amount to less than 0.5% by weight.

The proportion of palladium metal in the total weight of catalyst is preferably from 0.5 to 10%, more preferably from 0.5 to 5% and in particular from 1.5 to 2.5%.

The catalyst is found to be particularly effective when the palladium metal is present in a finely divided form on the pyrogenic titanium oxide, with crystallite sizes of from 5 to 50 nm and its carbon monoxide adsorption is from 1.0 to 2.0 ml of CO/g.

In special embodiment of the catalyst the pyrogenic titanium oxide is present as a molded body having a BET surface area of 50±15 m$^2$/g and a total pore volume of from 0.25 to 0.75 ml/g and the palladium metal is homogeneously distributed in the molded body.

The invention is not limited to a special form of catalyst body; catalysts in the form of granules or pellets or with extruded carriers, which can all be produced by known processes, are equally suitable.

The second object of the invention, namely the provision of a suitable process for the preparation of the catalyst according to the invention, is achieved by a process of preparation which comprises the following general steps: Shaping of the pyrogenic titanium oxide to the desired form in the green state with the addition of conventional processing auxiliaries, drying and subsequent calcining of the green bodies to remove the processing auxiliaries, impregnation of the calcined titanium oxide bodies with an aqueous palladium salt solution, drying of the impregnated bodies and reduction and activation of this catalyst precursor in the stream of hydrogen. This method of preparation is characterized in that the titanium oxide green bodies are first dried at 110° C. for 12 hours and then calcined for 0.5 to 5 hours, preferably one hour, at temperatures from 350° to 480° C., in particular around 400° C. The palladium salt solution used for impregnation is adjusted to pH=4. The quantity and concentration of the solution are calculated to provide a proportion of palladium in the finished catalyst of from 0.5 to 10% by weight, preferably from 0.5 to 5 and in particular from 1.5 to 2.5% by weight. Drying of the impregnated body is carried out in a vacuum drying cupboard at 70° to 100° C. for 2 to 3 hours. The final reduction and activation of the catalyst in the stream of hydrogen is carried out at temperatures of from 150° to 300° C., preferably from 200° to 250° C., for a period of from 0.5 to 10 hours, preferably from 0.5 to 2 hours.

BRIEF DESCRIPTION OF THE DRAWINGS

The invention will be further understood with reference to the drawings, wherein:

FIG. 2 shows a fat hardening installation for the continuous hardening of fatty acids in a trickle bed.

DETAILED DESCRIPTION OF THE INVENTION

Figure 1:
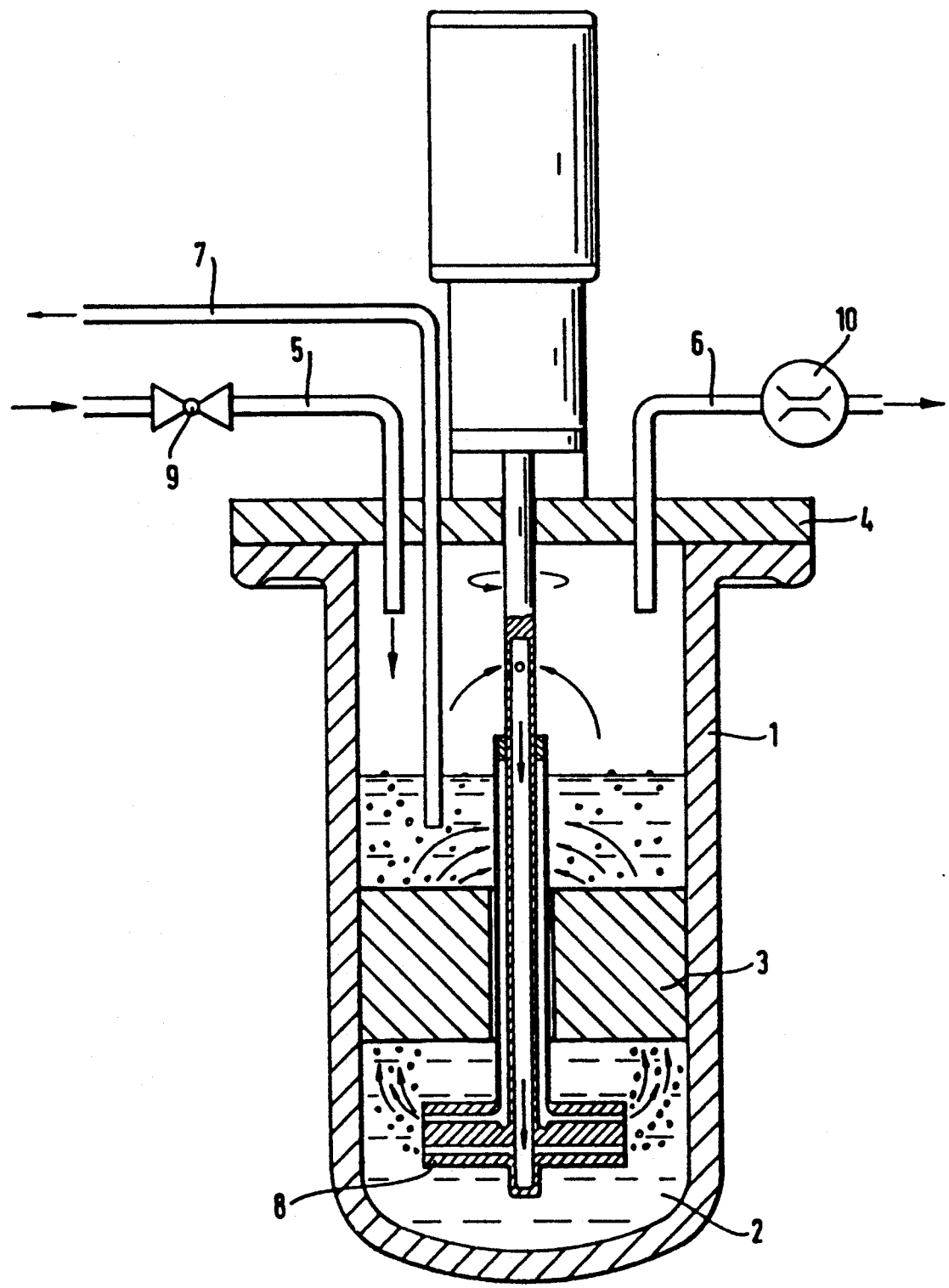
FIG. 1 shows a Hastelloy-autoclave of 1 liter capacity for fatty acid hardening by the batch process.

The outstanding properties of the catalyst may be attributed inter alia to the properties of the pyrogenic titanium oxide. It generally has an average primary particle size of about 20 nm and a BET surface area of 50 m$^2$/g. Its crystal structure is characterized by a high proportion of rutile, amounting to 20 to 40%. Titanium oxides used in the present state of the art (U.S. Pat. No. 4,479,902), on the other hand, are produced by precipitation by the sulphate or chloride process. These titanium oxides generally have a substantially larger BET surface area than pyrogenic titanium oxide. Thus the oxide use in U.S. Pat. No. 4,479,902 has a surface area of 130 m$^2$/g. The precipitated titanium oxides are either amorphous or present in the anatase phase.

For use on a large industrial scale, the precipitated titanium oxides are calcined in a rotary tubular kiln. Depending on the conditions employed for the process, the products are titanium oxide powders of the anatase or rutile phase having particle diameters of 0.3 $\mu$m and a small specific surface areas, amounting to 10 m$^2$/g. These materials are then not suitable for use as catalysts.

The examples, which are described below, show that the catalyst according to the invention has a substantially better catalytic activity than comparison catalysts which have been prepared according to the state of the art using precipitated titanium oxides having an amorphous or anatase structure. This is surprising since the surface area available for catalysis is much larger in precipitated titanium oxides than in pyrogenic titanium oxide. The reasons for the improved catalytic activity have not yet been elucidated. The catalyst according to the invention is evidently an optimum combination of the available surface area and the crystal structure on this surface.

The catalyst according to the invention is distinguished by good acid resistance of the active component and the carrier material. This property is of decisive importance for trouble-free long term operation in the continuous hardening of fatty acids. The possibility of regenerating the catalyst with atmospheric oxygen is particular advantageous. In a continuous operation, this must be carried out from time to time to burn off carbon-containing deposits from the carrier material and reestablish the original catalyst activity.

Owing to the good acid resistance of the catalyst according to the invention, its high activity and its low tendency to be poisoned, its preferred field of application is the continuous hardening in a trickling bed of crude fatty acids obtained from the decomposition of fats. There is, of course, no problem in hardening fatty acids which have been obtained as distillates.

In carrying out the process of the invention, the compounds used for impregnating the calcined molded body may be PdCl$_2$, PdBr$_2$, Pd(NO$_3$)$_2$. nH$_2$O, PdI$_2$, PdSO$_4$ or the complex salts, tetra-aminopalladium(II) chloride [Pd(NH$_3$)$_4$]Cl$_2$ and tetra-aminopalladium(II) nitrate [Pd(NH$_3$)$_4$]{NO$_3$}$_2$, as illustrative examples.

By its unique combination of known process steps and a suitable choice of process parameters, the method of preparation according to the invention ensures that the crystal structure and specific surface area of the pyrogenic titanium oxide undergo only slight changes during calcining so that the catalytic properties of the pyrogenic titanium oxide are fully preserved. In particular, limiting the calcining temperature to values below 500° C. prevents pronounced phase conversion of anatase into rutile which would be combined with an increase in particle size and reduction in the BET surface area.

The catalyst according to the invention is particularly suitable for a continuous process of hardening fatty acids. It has little tendency to be poisoned even when crude fatty acids are used and it provides a service life even without regeneration which convention nickel catalyst can provide only after repeated regeneration.

The effectiveness of the catalyst according to the invention formed of an intimate mixture of pyrogenic titanium oxide and finely divided palladium metal as the essential ingredients was confirmed by thorough test series and its superiority over state of the art catalysts of palladium metal and precipitated titanium oxide or active charcoal was demonstrated.

To characterize the catalyst, the specific BET surface area of the molded bodies after calcining, their pore volume and their distribution of pore radii were determined and the active metal surface area of the finished catalysts was determined by CO adsorption measurements.

The determination of the specific surface area is standardized in DIN 66131 ("Determination of the specific surface area according to BET"). According to a IUPAC recommendation, the pores are classified as micropores, mesopores and macropores, which are distinguished as follows:

| | |
|---|---|
| Micropores | $\phi$: <2 nm |
| Mesopores | $\phi$: 2–50 nm |
| Macropores | $\phi$: >50 nm. |

The volume of the micropores is determined by the nitrogen adsorption and evaluated according to Brunauer, Emmett and Teller. For the determination of the mesopores, the nitrogen adsorption is evaluated according to De Boer. The macropores are determined by mercury porosometry.

Carbon monoxide adsorption is used as a measure of the active metal surface area of the finished catalysts. The value obtained indicates the degree of metal dispersion. An additional transmission electromicroscopic (TEM) investigation may be carried out for direct determination of the particle size distribution of the metal crystallites.

The methods for surface area and pore volume determination are described in the following articles and books:
1. S. Brunauer, P. H. Emmett., E. Teller
   J. Am. Chem. Soc., 60 (1938) 309
2. J. H. De Boer
   "The Dynamic Character of Adsorption"
   The clarendon Press, Oxford, 1953
3. S. Brunauer
   "Sorption of Gases and Vapours"
   Princeton Univ. Press, Princeton, N.J., 1945
4. T. Paryczak
   "Gas Chromatography in Adsorption and Catalysis"

E. Horwood Ltd., John Wily & Sons, New York, 1986.

The properties of the catalyst according to the invention were tested in batch hardening processes and in continuous hardening in a trickle bed. The apparatus used are illustrated in FIGS. 1 and 2.

Conventional catalysts of titanium oxide, quartz and active charcoal were tested as well as the catalysts according to the invention. The catalysts were used in the form of granulates, pellets and extrudates. The preparation of these molded products is described below.

EXAMPLES

Example 1: Preparation of the extrudates 1,000 g of Pyrogenic titanium oxide P 25 (Degussa) and 5,000 ml of VE water (completely desalted water) were introduced into a kneading extruder (Werner and Pfleiderer) and briefly kneaded until the water and titanium oxide were homogeneously mixed. 10 g of tylose (MH 1,000; Fluka) dissolved in 200 ml of VE water were then added.

The mixture was kneaded for one hour until a plastic mass was obtained. The mass was then extruded to form particles 1 mm in diameter and about 10 mm in length which were dried for about 12 hours in a drying cupboard at 110° C. After drying, the molded particles were calcined in a hot air tempering oven at 400° C. for one hour.

Example 2: Preparation of the granulates 1,000 g of pyrogenic titanium oxide P 25 (Degussa) were introduced into a granulating vessel (Eirich mixer, Eirich) and granulated with slow additional of a total of 350 ml of VE water, first at the rate of 1,000 revs/min of the mixer and finally at 3,000 revs/min. The temperature in the mixer rose from room temperature to 50° C. during the granulating process. Granulation was terminated after about 9 minutes. The granulate was then dried in a rotary tubular kiln at 200° C. The granulate thus produced had the following particle size distribution:

| | |
|---|---|
| Particle diameter | >1 mm: 39% by weight |
| Particle diameter | 0.5–1 mm: 32% by weight |
| Particle diameter | <0.5 mm: 29% by weight. |

Example 3: Preparation of the pellets 1,000 g of titanium oxide an 100 g of stearic acid were thoroughly mixed together and compressed in a Fette-Exacta tabletting machine to form pellets measuring 5×3.2 mm. The pellets were then heated to 400° C. in a hot air tempering apparatus for one hour at a throughput of air of 60 m$^3$/h.

12 different carriers based on titanium oxide and silicon oxide were prepared for the catalyst test. Table 1 gives a list of these 12 carriers with information on the methods of preparation of the starting materials (either by pyrolysis or by precipitation reactions) and the form of the finished catalyst carriers. The molded bodies were either prepared according to one of the Examples 1 to 3 or obtained commercially. Table 1 in addition contains data on the structure of the carrier material, its BET surface area and its porosity. An active charcoal carrier was also used for comparison (Carrier No. 13 in Table 1).

Carriers 1 and 2 of this Table are molded bodies of pyrogenic titanium oxide according to the invention. Carriers 4 to 10 consist of conventional titanium oxide obtained by precipitation.

Carriers 11 and 12 of Table 1 are produced from pyrogenic $SiO_2$. Carriers 3 and 6 correspond to carriers 1 and 5 but are calcined at 600° C. instead of at 400° C. As shown in Table 1, the higher calcining temperature results in a drastic reduction in the BET surface area (from 48 to 13 $m^2/g$ and from 151 to 9.9 $m^2/g$) and the porosity. This is due to the conversion of anatase into rutile which sets in above 500° C. The carriers of Table 1 were used for preparing the catalysts shown in Table 2.

Impregnation and activation of the catalysts were carried out as follows:

Example 4: Impregnation and reduction of the catalyst bodies

The catalyst bodies were impregnated by the "incipient-Wetness-Method". For this purpose, the maximum water absorption capacity of each body was first determined and a palladium chloride solution was then prepared. The volume of this solution corresponded to about 95% of the maximum absorption capacity of the given quantity of molded particles and its palladium content was adjusted to the required palladium content of the finished catalyst. The solution was adjusted to pH=4 by the addition of hydrochloric acid and the solution was then evenly distributed over the molded particles. When the total quantity of solution had been absorbed, the impregnated molded particles were dried in a vacuum drying cupboard, first at 70° C. and 150 mbar for one hour and then at 24 mbar for a further 2 hours.

After impregnation, the catalyst particles contain homogeneously distributed $PdCl_2$ crystals. These crystals were reduced to metallic palladium in a stream of hydrogen for activating the catalysts. For this purpose, the impregnated particles were heated to 230° C. in a stream of nitrogen and the nitrogen was replaced by hydrogen when the temperature reached 230° C. The reaction which set in was clearly exothermic and the temperature rose from 280° C. to 285° C. during the reduction. After about one hour, the temperature was reduced to 100° C. and nitrogen was passed over the catalyst until room temperature was reached.

The resulting catalysts according to the invention 1, 2 and 14 to 17 are listed in Table 2 together was the Comparison catalysts 3 to 13. Table 2 shows the carrier used, the palladium content and the CO adsorption of the catalysts. Catalysts 14 to 17 according to the invention were impregnated with various palladium contents to determine the influence of the palladium content on the hardening of fats.

To compare the catalytic activities of the various catalysts, test hardening according to Example 5 were carried out in Examples 6 to 9, using the Hastelloy autoclave of FIG. 1.

Example 5: Testing of the Activity of the Fatty Acid Hardening Catalysts

As shown in FIG. 1, the Hastelloy autoclave comprises a vessel (1) having a capacity of 1 liter. The lid (4) of the autoclave has an opening for the introduction of the gassing stirrer (8), a gas inlet (5) via a valve (9), a gas outlet (6) via a flow meter (10) and an immersion tube (7) for the removal of samples.

To determine the catalyst activity, 500 g of crude fatty acid (2) were introduced into the vessel and 5 g of catalyst and 55 g of active charcoal were introduced into the catalyst basket (3). When the catalyst basked had been put into place, the autoclave was sealed with the lid (4) and heated to 220° C. The fatty acid was then hardened under a hydrogen pressure of 2 Mpa, a hydrogen flow rate of 1,000 $1H_Z/h$ and a stirrer speed of 1,700 revs/min. A sample of fatty acid was removed hourly by means of the immersion tube (7) to determine the iodine number and acid number. Test hardening was terminated after 5 hours.

Different batches of crude fatty acids from beef tallow were used for the test hardening. The main constituents of beef tallow are palmitic acid (20–37%) having 16 carbon atoms, stearic acid (15–30%) having 18 carbon atoms and mono-unsaturated oleic acid (20–50%) also having 18 carbon atoms. The exact composition depends on the origin of the beef tallow and may vary from one batch to another. For the following Examples, three different batches of beef tallow differing slightly in their iodine and acid numbers were used.

Example 6: Progress of Hardening with Time of Fatty Acid Batch 1 with Catalyst 1

Table 3 shows the progress of hardening with time of fatty acid batch 1 when catalyst 1 according to the invention was used. After 5 hours of hardening, the iodine number had fallen from the initial value of 55.9 to 6.9. The acid number, on the other hand, had fallen only slightly, from 193.4 to 182.5.

Example 7: Comparison of the Activity of Different Catalysts in Hardening Fatty Acid Batch 1

Table 4 shows the results of test hardening after 5 hours. Catalysts 1 and 2 according to the invention were compared with comparison catalysts 3, 5, 6, 7, 8 and 13.

Catalysts 1 and 2 according to the invention based on pyrogenic titanium oxide provide the lowest iodine number and produce the lowest reduction in acid number. Comparison catalyst 3, which was calcined at 600° C. for comparison with catalyst 1, gives poor results similar to those of conventional comparison catalysts based on precipitated titanium oxide. Comparison catalyst 13, which uses active charcoal as carrier, comes closest to the catalyst according to the invention in the final iodine number but results in a severe reduction in the acid number.

Example 8: Comparison of the Activity of Various Catalysts in Hardening Fatty Acid Batch 2

Table 5 gives the results of test hardening after 5 hours. Catalyst 1 according to the invention was compared with comparison catalysts 4, 9, 10, 11 and 12.

Catalyst 1 according to the invention provides the best results also in this example. The values obtained with catalyst 11 and 12 using pyrogenic $SiO_2$ as carriers are at the poorest level of convention catalysts.

Examples 7 and 8 show that the comparison catalysts based on precipitated titanium oxide, pyrogenic silica or active charcoal provide poorer hardening results than catalyst 1 and 2 according to the invention in spite of having in some cases considerably larger BET surface areas and greater CO adsorption. This clearly confirms that the good catalytic activity of the catalysts according to the invention is not due only to the metal dispersion but also to a significant extent to the pyrogenic titanium oxide used as carrier material according to the invention.

Example 9: Dependence of the Catalytic Activity on the Palladium Content

To investigate the dependence of the catalytic activity of the catalyst according to the invention, catalyst 14 to 17 of Table 2 were prepared with various palladium contents (0.5; 1; and 5% by weight), using carrier No. 1 according to the invention. The hardening results of fatty acid batch 1 after 5 hours are shown in Table 6.

The final iodine number increases continuously with increasing palladium content. No saturation is observed even with a charge of 5% by weight of palladium. This applies analogously to state of the art catalyst. The advantage of the catalyst according to the invention, however, lies in the fact that as a results of the reinforcing effect of the carrier material, the same catalytic activity is obtained with smaller palladium charges and hence with lower costs of noble metal.

Example 10: Comparison of the Activity of Catalysts 1 and 13 in the Continuous Hardening of Crude Fatty Acid in a Trickling Bed The catalysts according to the invention are particularly suitable for the continuous hardening of crude fatty acid in a trickling bed owing to their relatively high resistance to poisoning.

The installation illustrated in FIG. 2 was used for experiments for continuous fatty acid hardening. The starting material (11) (unsaturated fatty acid) was metered into the hardening installation from a storage vessel (12) by means of the pump (13) and at the same time compressed to the required reaction pressure, heated to the reaction temperature as a two-phase mixture with compressed hydrogen (14) in the heater (15) and transferred to the reactor (16).

The reactor consisted of a vertically arranged pipe and contained a heap of the catalyst to be treated, which was supported at the bottom of the reactor by a sieve plate. The heat of reaction was removed by means of an external heating/cooling circulation (17).

The mixture of preheated starting material and hydrogen was introduced at the head (18) of the reactor and applied uniformly to the surface of the catalyst bed by means of a gas/liquid distribution system. The two phases flowed unidirectionally through the heap of catalyst from above downwards.

After leaving the reactor, the liquid product and unreacted hydrogen were cooled in a heat exchanger (19) and transferred to a separator (20) where the bulk of the product was separated from the stream of gas and discharged into the product receiver (21) with depressurization.

The gas underwent further cooling (22) and was separated from remaining product constituents in a second separator (23). These product constituents were also introduced with depressurisation into the product receiver (21). The gas left the hardening installation via a pressure retaining valve (24). Hydrogenation of the fatty acid was preferably carried out with an excess of hydrogen.

A comparison of catalyst 1 according to the invention with the best comparison catalyst of the state of the art on active charcoal as carrier is given in Table 7. The catalyst according to the invention was used in the form of a granulate and the active charcoal catalyst was in the form of extruded strands. The trickling bed was operated with LHSV-values of 1.2 $H^{-1}$ at temperatures in the region of 170° C.

Example 11: Comarison of the Activity of Catalysts 1 and 13 in the Continuous Hardening of Distilled Fatty Acid in a Trickling Bed The comparison was carried out in the installation described in Example 10. The results of this comparison are listed in Table 8.

In the last two examples, the catalyst according to the invention also showed itself to be far superior to the active charcoal catalyst when the continuous trickling bed process was employed. This was particularly clear when hardening of crude fatty acid was carried out (Table 7), with the attendant high exposure to catalyst poisons. The catalyst according to the invention in this case resulted in an iodine number which was smaller by an order of magnitude, a results which confirms the low capacity of the catalyst according to the invention for being poisoned.

TABLE 1

Porosity and surface data of the inoganic carriers based on $TiO_2$, $SiO_2$ and active charcoal

| Carrier No. | Material | Preparation of starting materials | Moulded particles | Structure | BET surface area | Porosity [ml/g] micro | meso | macro | total |
|---|---|---|---|---|---|---|---|---|---|
| 1 | $TiO_2$ (Degussa P25) | Pyrolysis | Granulate/Ex. 2 | Rutile/anatase | 48 | — | 0.27 | 0.06 | 0.33 |
| 2 | $TiO_2$ (Degussa P25) | Pyrolysis | Extrudate/Ex. 1 | Rutile/anatase | 46 | — | 0.25 | 0.05 | 0.30 |
| 3 | $TiO_2$ (Degussa P25) | Pyrolysis*) | Granulate/Ex. 2 | Rutile/anatase | 13 | — | 0.05 | 0.13 | 0.18 |
| 4 | $TiO_2 \cdot nH_2O$ (Metatitans.) | Precipitation | Pellets/Ex. 3 | Radiographically amorphous | 287 | 0.14 | 0.1 | 0.13 | 0.37 |
| 5 | $TiO_2$ Harshaw | Precipitation | Pellets/commercial | Traces rutile/anatase | 151 | — | 0.38 | 0.03 | 0.41 |
| 6 | $TiO_2$ Harshaw | Precipitation*) | Pellets/commercial | Traces rutile/anatase | 9.9 | — | 0.02 | 0.32 | 0.34 |
| 7 | $TiO_2$ Sudchemie | Precipitation | Pellets/commercial | Anatase | 32 | — | 0.13 | 0.13 | 0.26 |
| 8 | $TiO_2$ Sudchemie | Precipitation | Pellets/commercial | Anatase | 40 | — | 0.12 | 0.43 | 0.55 |
| 9 | $TiO_2$ Bayer PK 5585/1 | Precipitation | Pellets/Ex. 3 | Anatase | 99 | — | 0.32 | 0.32 | 0.64 |
| 10 | $TiO_2$ Bayer PK 5585 | Precipitation | Pellets/Ex. 3 | Anatase | 182.5 | 0.08 | 0.21 | 0.28 | 0.57 |
| 11 | $SiO_2$ Degussa | Pyrolysis | Pellets/commercial | Radiographically amorphous | 45 | — | — | — | 0.6 |
| 12 | $SiO_2$ Degussa | Pyrolysis | Pellets/commercial | Radiographically amorphous | 270 | — | — | — | 0.75 |
| 13 | Active charcoal | | Extrudate | Radiographic- | 1340 | | | | |

TABLE 1-continued

Porosity and surface data of the inoganic carriers based on $TiO_2$, $SiO_2$ and active charcoal

| Carrier No. | Material | Preparation of starting materials | Moulded particles | Structure | BET surface area | Porosity [ml/g] micro | meso | macro | total |
|---|---|---|---|---|---|---|---|---|---|
| | | | | ally amorphous | | | | | |

*): calcined at 600° C.

TABLE 2

Catalysts for test hardenings

| Sample to be tested | Carrier No. | Surface [m²/g] | Pd Content [%] | CO adsorption [mlCO/g] |
|---|---|---|---|---|
| Catalyst 1 | 1 | 48 | 2.0 | 1.66 |
| Catalyst 2 | 2 | 46 | 2.0 | 1.66 |
| Comparison catalyst 3 | 2 | 13 | 2.0 | 0.54 |
| Comparison catalyst 4 | 3 | 287 | 2.0 | 0.41 |
| Comparison catalyst 5 | 4 | 151 | 2.0 | 0.99 |
| Comparison catalyst 6 | 5 | 9.9 | 2.0 | 0.27 |
| Comparison catalyst 7 | 6 | 32 | 2.0 | 1.28 |
| Comparison catalyst 8 | 7 | 40 | 2.0 | 1.62 |
| Comparison catalyst 9 | 8 | 99 | 2.0 | 1.86 |
| Comparison catalyst 10 | 9 | 182 | 2.0 | 1.75 |
| Comparison catalyst 11 | 10 | 45 | 2.0 | 0.44 |
| Comparison catalyst 12 | 11 | 270 | 2.0 | 1.21 |
| Comparison catalyst 13 | 12 | 1340 | 2.0 | 1.91 |
| Catalyst 14 | 1 | 48 | 0.5 | |
| Catalyst 15 | 1 | 48 | 1.0 | |
| Catalyst 16 | 1 | 48 | 2.0 | |
| Catalyst 17 | 1 | 48 | 5.0 | |

TABLE 3

Test hardening of FS batch 1 with Catalyst No. 1

| Duration of Experiment [h] | Temp. [°C] | Pressure [MPa] | Iodine number | Acid number |
|---|---|---|---|---|
| −0.53 | 75 | 0.3 | 55.9 | 193.4 |
| 0.0 | 220 | 2.0 | — | — |
| 1.0 | 220 | 2.0 | 28.6 | — |
| 2.0 | 220 | 2.0 | 19.3 | — |
| 3.0 | 220 | 2.0 | 14.2 | — |
| 5.0 | 220 | 2.0 | 6.9 | 182.5 |

FS = fatty acid

Data for fatty acid batch 1:

| | |
|---|---|
| Iodine number according to Wijs (see DAB 7): | 55.9 g $I_2$/100 g FS |
| Acid number (see DAB 7): | 193.4 mg KOH/g FS |
| Data for hydrogenation: | Temperature 220° C. |
| | $H_2$ pressure 2.0 MPa |
| | Duration 5 h |

TABLE 4

$TiO_2$ carrier catalysts containing 2% by weight Pd (FS Batch 1)

| Sample for testing | Carrier No. | Iodine number according to Wijs | Acid No. |
|---|---|---|---|
| Catalyst 1 | 1 | 6.9 | 182.5 |
| Catalyst 2 | 2 | 9.6 | 180.7 |
| Comparison catalyst 3 | 2 | 26.5 | 172.0 |
| Comparison catalyst 5 | 4 | 36.1 | 172.0 |
| Comparison catalyst 6 | 5 | 39.7 | 178.1 |
| Comparison catalyst 7 | 6 | 35.4 | 180.0 |
| Comparison catalyst 8 | 7 | 27.7 | 178.8 |
| Comparison catalyst 13 | 12 | 11.2 | 173.8 |

TABLE 5

$TiO_2$ Carrier catalysts containing 2% by weight Pd (FS Batch 2)

| Sample to be tested | Carrier No. | Iodine number according to Wijs | Acid No. |
|---|---|---|---|
| Catalyst 1 | 1 | 10.0 | 189.2 |
| Comparison catalyst 4 | 3 | 29.6 | 190.4 |
| Comparison catalyst 9 | 8 | 21.8 | 185.8 |
| Comparison catalyst 10 | 9 | 31.4 | 187.2 |
| Comparison catalyst 11 | 10 | 31.7 | 184.7 |
| Comparison catalyst 12 | 11 | 33.9 | 186.5 |

Data for fatty acid batch 2:

| | |
|---|---|
| Iodine number | 49.6 g $I_2$/100 g FS |
| Acid number: | 197.8 mg KOH/g FS |

TABLE 6

Comparison of activity of pyrogenic titanium oxide catalysts with different Pd charges (0.5 to 5% by weight)

| Sample to be tested | Carrier No. | Pd Content [% by wt.] | Pressure [MPa] | Temp. [°C] | Time [h] | Iodine number | Acid number |
|---|---|---|---|---|---|---|---|
| Catalyst 14 | 1 | 0.5 | 2.0 | 220 | 5 | 45.8 | 177.7 |
| Catalyst 15 | 1 | 1.0 | 2.0 | 220 | 5 | 27.1 | 177.0 |
| Catalyst 16 | 1 | 2.0 | 2.0 | 220 | 5 | 6.9 | 182.5 |
| Catalyst 17 | 1 | 5.0 | 2.0 | 220 | 5 | 1.4 | 183.7 |

FS Batch: 1; Iodine number: 55.9; Acid number: 193.4

TABLE 7

Comparison of the activity of Pd-active charcoal and Pd—$TiO_2$ catalysts in trickling bed with crude fatty acid (Iodine number = 55.4)

| Sample to be tested | Carrier No. | LHSV [l/h] | Temp. [°C] | Conversion [%] | Iodine number | Acid number |
|---|---|---|---|---|---|---|
| Catalyst 1 | 1 | 1.20 | 169 | 99.4 | 0.30 | 194.8 |

TABLE 7-continued

Comparison of the activity of Pd-active charcoal and Pd—TiO₂ catalysts in trickling bed with crude fatty acid (Iodine number = 55.4)

| Sample to be tested | Carrier No. | LHSV [l/h] | Temp. [°C.] | Conversion [%] | Iodine number | Acid number |
|---|---|---|---|---|---|---|
| Comparison catalyst 13 | 12 | 1.20 | 171 | 91.4 | 4.66 | 194.5 |

TABLE 8

Comparison of the activity of Pd-active charcoal and Pd—TiO₂ catalysts in the trickling bed with distilled fatty acid (Iodine number = 54.2)

| Sample to be tested | Carrier No. | LHSV [l/h] | Temp. [°C.] | Conversion [%] | Iodine number | Acid number |
|---|---|---|---|---|---|---|
| Catalyst 1 | 1 | 1.07 | 170 | 99.7 | 0.16 | 202.6 |
| Comparison catalyst 13 | 12 | 1.07 | 170 | 98.6 | 0.74 | 203.4 |

Further variations and modifications will be apparent to those skilled in the art from a reading of the foregoing and are intended to be encompassed by the claims appended hereto.

German priority document P 41 09 502.2 is relied on and incorporated by reference.

We claim:

1. A molded catalyst for hardening crude unsaturated fatty acids, comprising an intimate mixture of titanium oxide and finely divided palladium metal, wherein said titanium oxide is pyrogenic titanium oxide obtained by subjecting titanium tetrachloride to flame hydrolysis.

2. The catalyst according to claim 1, wherein said pyrogenic titanium oxide has an average size of primary particles of 20 nm, a density of 3.7 g/cm³ and an X-ray structure of 20 to 40% rutile and 80 to 60% anatase and the impurities silicon dioxide, aluminum oxide and iron oxide amount to less than 0.5% by weight.

3. The catalyst according to claim 1, wherein the palladium metal amounts to a proportion of the total weight of catalyst of from 0.5 to 10%.

4. The catalyst according to claim 3, wherein the amount is 0.5 to 5%.

5. The catalyst according to claim 3, wherein the amount is 1.5 to 2.5%.

6. The catalyst according to claim 1, wherein the palladium metal is present on the pyrogenic titanium oxide in a finely divided form with crystallite sizes of from 5 to 50 nm and its carbon monoxide adsorption ranges from 1.20 to 2.0 ml of CO/g.

7. The catalyst according to claim 1, wherein the pyrogenic titanium oxide is present as a molded body having a BET surface areas of from 50±15 m²/g and a total pore volume of from 0.25 to 0.75 ml/g and the palladium metal is homogeneously distributed in the molded body.

8. A process for the preparation of the catalyst according to claim 1 comprising molding pyrogenic titanium oxide to the desired molded body in the green state, drying the titanium oxide green bodies at 110° C. for 12 hours and then calcining at temperatures from 350° to 480° C., for a period of from 0.5 to 5 hours, impregnating the calcined titanium oxide body with an aqueous palladium salt solution, the pH of the palladium salt solution used for impregnation being adjusted to pH=4 and the quantity and concentration of said solution being calculated to provide a finished catalyst containing from 0.5 to 10% by weight, of palladium, drying the impregnated molded body in a vacuum drying cupboard at a pressure of from 20 to 150 mbar and temperatures from 70° to 100° C. for a period of from 2 to 3 hours and then carrying out a final reduction and activation reaction of the molded catalyst body in a stream of hydrogen at temperatures from 150° to 300° C., for a period of from 0.5 to 10 hours.

9. The process according to claim 8 wherein the bodies are calcined at about 400° C.

10. The process according to claim 8 wherein the time for being calcined is one hour.

11. The process according to claim 8, wherein the concentration of the solution is calculated to provide 0.5 to 5% by weight of palladium.

12. The process according to claim 8 wherein the concentration of the solution is calculated to provide 1.5 to 2.5% by weight of palladium.

13. The process according to claim 8 wherein the final reduction is carried out at 200° to 250° C. for a period of 0.5 to 2 hours.

14. A molded catalyst for hardening crude unsaturated fatty acids, comprising an intimate mixture of titanium oxide and finely divided palladium metal, wherein said titanium oxide is pyrogenic titanium oxide obtained by subjecting titanium tetrachloride to flame hydrolysis, wherein said pyrogenic titanium oxide has an X-ray structure of 20 to 40% rutile and 80 to 60% anatase and is present as a molded body having a BET surface area of from 50±15 m²/g.

* * * * *